UNITED STATES PATENT OFFICE.

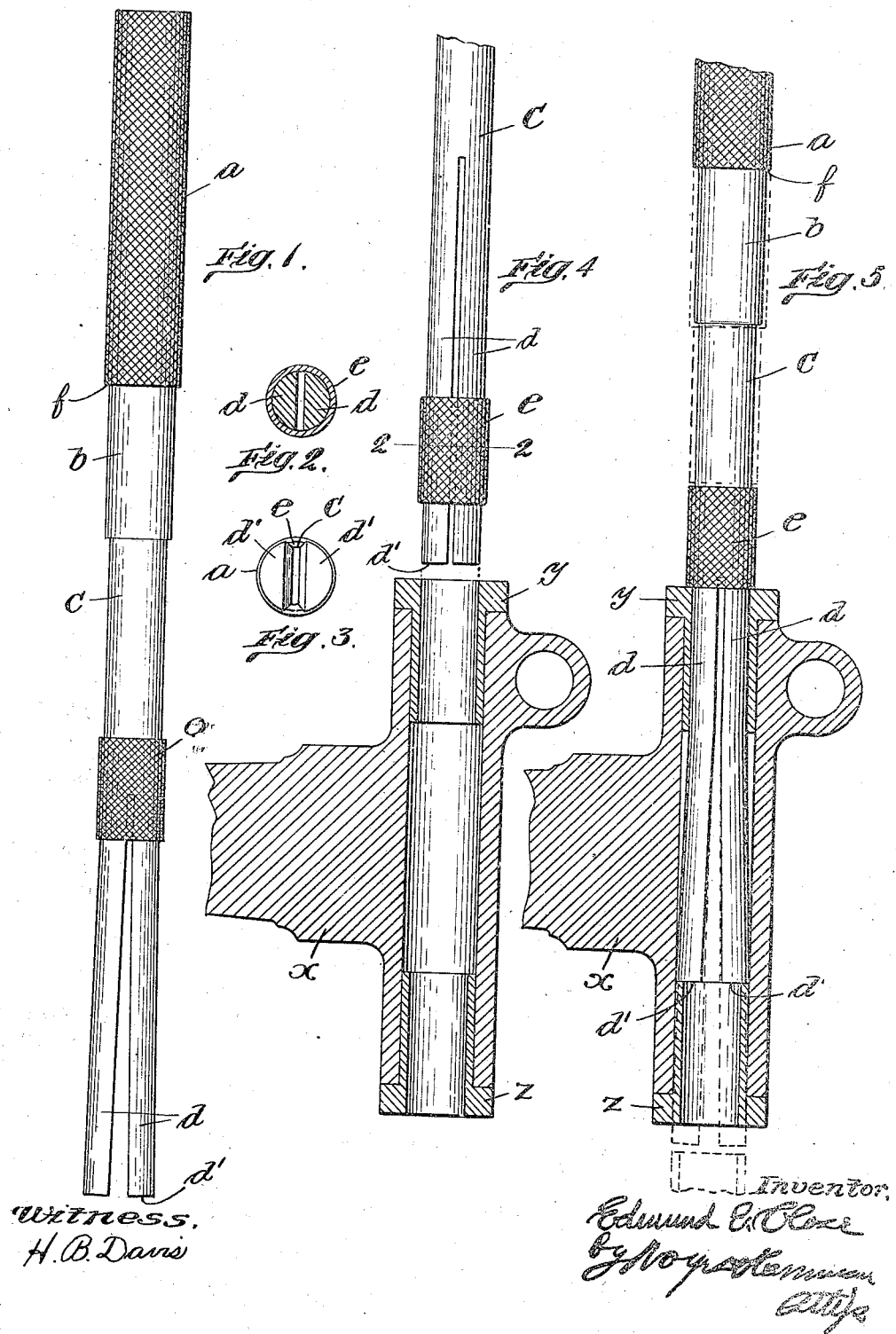

EDMUND E. CLOSE, OF MONTELLO, MASSACHUSETTS, ASSIGNOR TO JOSEPH D. POITRAS, TRUSTEE, OF BROCKTON, MASSACHUSETTS.

BUSHING-EXTRACTOR.

1,201,997. Specification of Letters Patent. Patented Oct. 17, 1916.

Application filed May 8, 1916. Serial No. 96,025.

*To all whom it may concern:*

Be it known that I, EDMUND E. CLOSE, a citizen of the United States, residing at Montello, in the county of Plymouth and State of Massachusetts, have invented an Improvement in Bushing-Extractors, of which the following is a specification.

In certain parts of automobiles, and other machines, bearing bushings are employed which are inserted in the opposite ends of a bore, instead of having a single bushing extend entirely therethrough, and considerable difficulty is experienced in removing these bushings, when it becomes necessary to renew them, particularly when they must be removed from the end at which they were inserted, as is the case when flanged bushings are employed.

The object of my invention is to provide a form of tool by means of which bushings, arranged as above described, may be readily and easily removed. I accomplish this object by providing a form of tool which is adapted to be inserted through one bushing, and then be expanded, so that it engages the inner end of the other bushing, thereby enabling the latter to be driven out by forcing the tool against the bushing thus engaged.

For a more complete understanding of my invention, reference is made to the accompanying drawing, in which:—

Figure 1 is an elevation of a tool embodying my invention. Fig. 2 is a sectional view on the lines 2—2 of Fig. 4. Fig. 3 is an end view of the device. Figs. 4 and 5 are sectional views of a machine part illustrating the manner of use of my device.

As shown in the drawing, my device consists of a round metal rod, preferably of steel, formed to comprise an enlarged handle portion $a$ at one end of the tool, a relatively short shank portion $b$, of reduced diameter, and an elongated cylindrical shank portion $c$, of still less diameter, the end-portion of which is split by a central longitudinal slot, to provide a pair of semi-cylindrically shaped legs $d$, which are set to spring apart, so that they extend divergently, to a suitable extent, as shown in Fig. 1. The ends of said legs are square with the sides, to provide flat engaging faces $d'$.

A sleeve $e$ is mounted to fit closely on the shank portion $c$, the external diameter of said sleeve being preferably not greater than the shank portion $b$. As thus arranged, said sleeve may be slid over the legs $d$, when pressed together, or by forcing the sleeve onto the legs the latter will be pressed together into parallelism.

In Figs. 4 and 5 a casting $x$ is illustrated, in connection with which my device is especially designed to be employed, the casting having a bore therethrough into the opposite ends of which flanged bushings $y$ and $z$ are inserted, the lengths of said bushings being such that their adjacent ends terminate at a substantial distance from each other. The bores of said bushings are of the same diameter, and the external diameter of the shank portion $c$, of the rod, is made to fit closely therein.

When using my device, the sleeve $e$ is first pressed down onto the bifurcated portion of the rod far enough to cause said legs to be pressed together until they lie in exact parallelism, as shown in Fig. 4. When thus pressed together they may be inserted in either of the bushings, and, in case it is desired to remove one of the bushings, as $z$, the legs $d$ will be pushed into the opposite bushing $y$, bringing the sleeve $e$ into engagement with the outer end of the latter, so that, as the rod is pushed in, the sleeve will be pushed back, and the legs $d$ will be permitted to swing apart within the bore of the casing, as they are pushed beyond the inner end of the bushing $y$, and by the time they have been pushed into the inner end of the opposite bushing, their end portions will have spread to the full diameter of the bore, with the result that, on further movement in the same direction, their end faces $d'$ will be brought into engagement with the inner end of the other bushing $z$, as indicated in Fig. 5. Further inward forcing of the rod will result in causing the bushing $z$ to be pushed out of the hole, as indicated in dotted lines in the same figure. The other bushing may then be removed by inserting the tool into the opposite end of the hole, as will be obvious.

The shoulder $f$, formed at the end of the handle portion, may be employed for removing bushings where they are not arranged in oppositely disposed pairs, as already indicated.

The above described device may be manufactured at small expense, and, as constructed, is adapted to withstand the force of very heavy blows, if necessary, to dislodge the bushing, the arrangement being practically as effective as a solid metal rod would be, if its introduction into the bore were possible.

I claim:—

A bushing remover comprising a rod having a bifurcated end portion providing a pair of resilient legs actuated to spring apart into divergent relation, and having transverse bushing-engaging faces at their ends, and a sleeve fitted to slide on the bifurcated portion thereof, and hold said legs in parallel relation, and movable from said portion to permit said legs to spring apart.

In testimony whereof, I have signed my name to this specification.

EDMUND E. CLOSE.

Witness:
L. H. HARRIMAN.